US011876818B2

(12) United States Patent
Oba

(10) Patent No.: US 11,876,818 B2
(45) Date of Patent: Jan. 16, 2024

(54) ANOMALY DETECTION METHOD AND ANOMALY DETECTION DEVICE

(71) Applicant: Panasonic Intellectual Property Corporation of America, Torrance, CA (US)

(72) Inventor: Tatsumi Oba, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 320 days.

(21) Appl. No.: 17/501,693

(22) Filed: Oct. 14, 2021

(65) Prior Publication Data

US 2022/0038482 A1 Feb. 3, 2022

Related U.S. Application Data

(63) Continuation of application No. PCT/JP2020/046135, filed on Dec. 10, 2020.

(30) Foreign Application Priority Data

Jan. 31, 2020 (JP) .................................. 2020-014786

(51) Int. Cl.
*H04L 9/40* (2022.01)
*H04L 43/04* (2022.01)

(52) U.S. Cl.
CPC .......... *H04L 63/1425* (2013.01); *H04L 43/04* (2013.01)

(58) Field of Classification Search
CPC ..... H04L 63/1425; H04L 43/04; H04L 43/18; H04L 69/40; G05B 23/02; G06N 20/00
See application file for complete search history.

(56) References Cited

U.S. PATENT DOCUMENTS 10,884,891 B2 * 1/2021 Awad .................. G06F 11/3476
11,373,257 B1 * 6/2022 Guo ....................... G06N 20/00
(Continued)

FOREIGN PATENT DOCUMENTS

CN 108667684 A * 10/2018 ............. H04L 43/08
CN 107231384 B * 11/2020 ......... H04L 63/1458
(Continued)

OTHER PUBLICATIONS

Abbasi, Fahim U H, "Detection and classification of malicious network streams in honeynets", a thesis presented in partial fulfilment of the requirements for the degree of Doctor of Philosophy in Computer Science at Massey University, Palmerston North, New Zealand, 1-196 pages (Year: 2013).*
(Continued)

*Primary Examiner* — Shahriar Zarrineh
(74) *Attorney, Agent, or Firm* — Greenblum & Bernstein, P.L.C.

(57) ABSTRACT

An anomaly detection method includes: calculating, for a detection target data stream of consecutive detection target data, distances between the detection target data; extracting features of the detection target data stream using the calculated distances; and calculating anomaly degree information about a degree of anomaly in the detection target data stream using the extracted features. Each extracted feature is made up of L consecutive distances (L is an integer greater than or equal to 2). For each feature extracted, supplementary information for calculating the anomaly degree information is calculated using a difference in the feature. For each of one or more information calculation target windows made up of N detection target data (N is an integer greater than or equal to L+1), the anomaly degree information is calculated using all supplementary information calculated from the N detection target data.

15 Claims, 14 Drawing Sheets

(56) References Cited

U.S. PATENT DOCUMENTS

| | | | | |
|---|---|---|---|---|
| 2015/0169393 A1* | 6/2015 | Shibuya | ............. | G05B 23/0243 |
| | | | | 702/182 |
| 2019/0124099 A1* | 4/2019 | Matselyukh | ............ | H04L 43/16 |
| 2020/0311596 A1* | 10/2020 | Jain | ......................... | G06F 18/22 |

FOREIGN PATENT DOCUMENTS

| | | | | | |
|---|---|---|---|---|---|
| EP | 2374256 | B1 | * | 7/2017 | ......... H04L 12/2602 |
| JP | 2019213183 | A | * | 12/2019 | ............. G06N 20/00 |
| WO | WO-2021258348 | A1 | * | 12/2021 | |

OTHER PUBLICATIONS

Zachary Miller, "Anomalous Network Packet Detection Using Data Stream Mining", Journal of Information Security, 2011, 2, 158-168, doi:10.4236/jis.2011.24016 Published Online Oct. 2011 (http://www.SciRP.org/journal/jis), 11 pages (Year: 2011).*

International Search Report (ISR) from International Searching Authority (Japan Patent Office) in International Pat. Appl. No. PCT/JP2020/046135, dated Feb. 16, 2021, together with an English language translation.

Ye, "A Markov Chain Model of Temporal Behavior for Anomaly Detection", Proceedings of the 2000 IEEE, Workshop on Information Assurance and Security, Jun. 2000, pp. 171-174.

Otey et al., "Fast Distributed Outlier Detection in Mixed-Attribute Data Sets", Data Mining and Knowledge Discovery, 2006, pp. 203-228.

* cited by examiner

FIG. 2

| Profile ID | Source IP | Target protocol | Target command |
|---|---|---|---|
| 1 | 192.168.0.1 | BACnet / IP | Write command |
| 2 | 192.168.0.1 | BACnet / IP | Read command |
| 3 | 192.168.0.2 | BACnet / IP | Status notification command |
| 4 | 192.168.0.3 | BACnet / IP | Status notification command |
| | ... | ... | ... |

FIG. 16

| Date | Severity | Description | Source | Destination | Protocol |
|---|---|---|---|---|---|
| 2019/1/1 10:01:22 | low | ICMP PING | 192.168.1.10 | 192.168.1.20 | ICMP |
| 2019/1/1 10:01:22 | low | ICMP PING undefined code | 192.168.1.10 | 192.168.1.20 | ICMP |
| 2019/1/1 10:01:22 | medium | SCAN nmap XMAS | 192.168.1.10 | 192.168.1.20 | TCP |
| 2019/1/1 10:01:22 | high | SHELLCODE x86 inc ebx NOOP | 192.168.1.10 | 192.168.1.20 | UDP |
| 2019/1/1 10:01:22 | medium | SCAN nmap XMAS | 192.168.1.10 | 192.168.1.20 | TCP |
| 2019/1/1 10:01:22 | high | SHELLCODE x86 inc ebx NOOP | 192.168.1.10 | 192.168.1.20 | UDP |

ANOMALY DETECTION METHOD AND ANOMALY DETECTION DEVICE

CROSS REFERENCE TO RELATED APPLICATIONS

This is a continuation application of PCT International Application No. PCT/JP2020/046135 filed on Dec. 10, 2020, designating the United States of America, which is based on and claims priority of Japanese Patent Application No. 2020-014786 filed on Jan. 31, 2020. The entire disclosures of the above-identified applications, including the specifications, drawings and claims are incorporated herein by reference in their entirety.

FIELD

The present disclosure relates to anomaly detection methods and devices for detecting an anomaly in data streams such as payloads in packets.

BACKGROUND

A conventionally known information processing technique is applied to data that is used in a network system or the like (for example, refer to Non Patent Literature (NPL) 1 and 2).

CITATION LIST

Non Patent Literature

NPL 1: Ye, N. (2000, June). A markov chain model of temporal behavior for anomaly detection. In Proceedings of the 2000 IEEE Systems, Man, and Cybernetics Information Assurance and Security Workshop (Vol. 166, p. 169). West Point, NY NPL 2: Otey, M. E., Ghoting, A., & Parthasarathy, S. (2006). Fast distributed outlier detection in mixed-attribute data sets. Data mining and knowledge discovery, 12(2-3), 203-228

SUMMARY

Technical Problem

It is desired to detect an anomaly in data streams such as packet streams that are used in a network system or the like.

Thus, the present disclosure has an object to provide an anomaly detection method and device for detecting an anomaly in data streams such as packet streams.

Solution to Problem

An anomaly detection method according to one aspect of the present disclosure includes: calculating, for a detection target data stream made up of a plurality of detection target data that are consecutive, a plurality of distances between the plurality of detection target data; extracting a plurality of features of the detection target data stream using the plurality of distances calculated; and calculating anomaly degree information about a degree of anomaly in the detection target data stream using the plurality of features extracted. The extracting of the plurality of features includes extracting the plurality of features each made up of L consecutive distances among the plurality of distances where L is an integer greater than or equal to 2. The calculating of the anomaly degree information includes: calculating supplementary information for each of the plurality of features extracted, using a difference in the feature, the supplementary information being used to calculate the anomaly degree information; and calculating the anomaly degree information for each of one or more information calculation target windows made up of N detection target data among the plurality of detection target data, using all items of supplementary information calculated from the N detection target data where N is an integer greater than or equal to L+1.

An anomaly detection device according to one aspect of the present disclosure includes: a detection target data distance calculator that calculates, for a detection target data stream made up of a plurality of detection target data that are consecutive, a plurality of distances between the plurality of detection target data; a feature extractor that extracts a plurality of features of the detection target data stream using the plurality of distances calculated by the detection target data distance calculator; and an information calculator that calculates anomaly degree information about a degree of anomaly in the detection target data stream using the plurality of features extracted by the feature extractor. The feature extractor extracts the plurality of features each made up of L consecutive distances among the plurality of distances where L is an integer greater than or equal to 2. The information calculator calculates supplementary information, which is used to calculate the anomaly degree information, for each of the plurality of features extracted by the feature extractor, using a difference in the feature, and calculates the anomaly degree information for each of one or more information calculation target windows made up of N detection target data among the plurality of detection target data, using all items of supplementary information calculated from the N detection target data where N is an integer greater than or equal to L+1.

Advantageous Effects

With the anomaly detection method and device according to one aspect of the present disclosure, it is possible to detect an anomaly in data streams such as packet streams.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a schematic diagram illustrating one example of profile information.

FIG. 16 is a diagram illustrating one example of a detection log that is output by an intrusion detection system.

DESCRIPTION OF EMBODIMENTS

Figure 1:
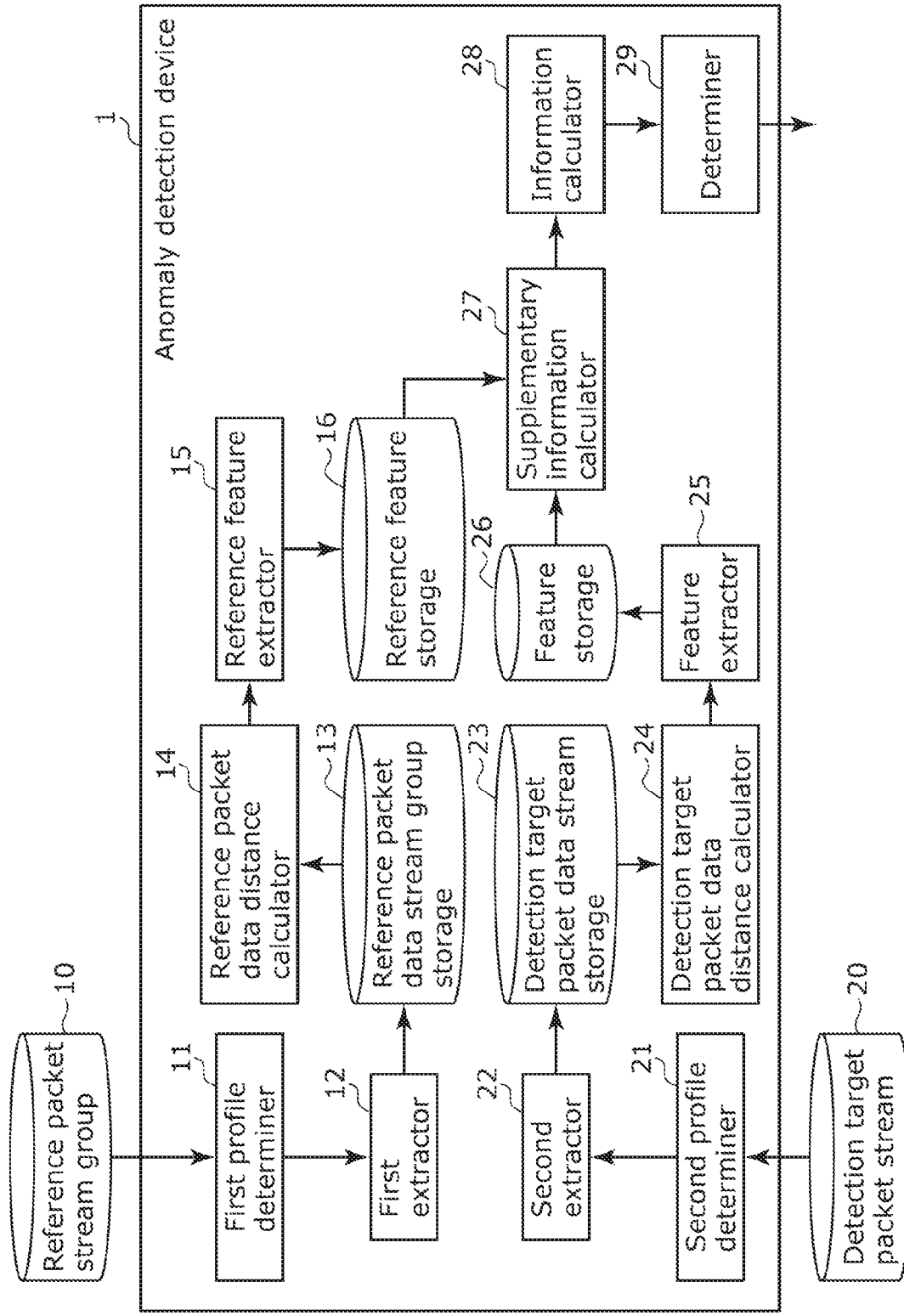
FIG. 1 is a block diagram illustrating the configuration of an anomaly detection device according to an embodiment.

Underlying Knowledge Forming Basis of the Present Disclosure

Cyber-attack cases in industrial control systems (ICSs) are on the rise. In the ICSs, a command string in a normal format for controlling a device could become a serious attack, and even an anomalous packet stream generated by a malicious attacker is almost indistinguishable from a normal packet stream when checked on a per-packet basis.

Conventionally known methods for detecting an anomaly in a packet stream include a rule-based approach and an anomaly-based approach. However, the rule-based approach is problematic in that it is difficult to detect an anomaly in a packet stream that is not described according to a rule, and the anomaly-based approach is problematic in that it is difficult to detect an anomaly in a packet stream unless there is a drastic increase in the amount of data, the number of packets, etc., or a drastic byte string disturbance.

In order to solve these problems, the inventor diligently repeated examinations and experiments. The inventor focused on the fact that a normal packet stream including a command for controlling a device has a constant context, and found that a packet stream deviated from the constant context can be detected as an anomalous packet stream. As a result, the inventor conceived of the following anomaly detection method and device.

An anomaly detection method according to one aspect of the present disclosure includes: calculating, for a detection target data stream made up of a plurality of detection target data that are consecutive, a plurality of distances between the plurality of detection target data; extracting a plurality of features of the detection target data stream using the plurality of distances calculated; and calculating anomaly degree information about a degree of anomaly in the detection target data stream using the plurality of features extracted. The extracting of the plurality of features includes extracting the plurality of features each made up of L consecutive distances among the plurality of distances where L is an integer greater than or equal to 2. The calculating of the anomaly degree information includes: calculating supplementary information for each of the plurality of features extracted, using a difference in the feature, the supplementary information being used to calculate the anomaly degree information; and calculating the anomaly degree information for each of one or more information calculation target windows made up of N detection target data among the plurality of detection target data, using all items of supplementary information calculated from the N detection target data where N is an integer greater than or equal to L+1.

According to this anomaly detection method, a feature of the context of the detection target data stream can be extracted as a feature. Furthermore, information about an anomaly in the detection target data stream can be calculated using the extracted feature. Thus, an anomaly in data streams such as packet streams can be detected using the above anomaly detection method.

Furthermore, the calculating of the plurality of distances may include calculating the plurality of distances by using data parts of packets as the plurality of detection target data.

Furthermore, the calculating of the plurality of distances may include calculating the plurality of distances by using a Levenshtein distance between the plurality of detection target data.

Furthermore, a Levenshtein distance between the plurality of detection target data may be calculated for each pair of detection target data that are P data apart from each other in the detection target data stream, and the calculation may be applied in units of Q bits to at least a portion of bit strings included in the data parts where P is an integer greater than or equal to 1 and Q is an integer between 1 and 16, inclusive, and in the calculating of the plurality of distances, a distance may be calculated for each pair of the detection target packets that are P data apart from each other in the detection target data stream to calculate the plurality of distances.

Furthermore, the calculating of the plurality of distances may include calculating the plurality of distances between limited pairs of detection target data that are of an identical type among the plurality of detection target data.

Furthermore, the difference may be an Lp distance.

Furthermore, the calculating of the supplementary information may include calculating the Lp distance between each of the plurality of features extracted and each of a plurality of reference features stored in advance, and calculating a k-nearest neighbor distance between the feature and the plurality of reference features stored in advance, as the supplementary information, using a k-nearest neighbor algorithm in which the Lp distance calculated is used.

Furthermore, the calculating of the anomaly degree information includes calculating the anomaly degree information by calculating, for each of the one or more information calculation target windows, a sum of all the items of the supplementary information calculated from the N detection target data.

Furthermore, the anomaly detection method may include: calculating, for each of one or more reference data streams made up of a plurality of reference data that are consecutive, a plurality of reference distances between the plurality of reference data; and extracting each of a plurality of reference features of the one or more reference data streams using a corresponding one of the plurality of reference distances calculated. The calculating of the anomaly degree information about the degree of anomaly in the detection target data stream may include calculating the anomaly degree information by further using each of the plurality of reference features extracted.

Furthermore, the calculating of the plurality of reference distances may include calculating the plurality of reference distances by using a Levenshtein distance between the plurality of reference data.

Furthermore, the Levenshtein distance between the plurality of reference data may be calculated for each pair of reference data that are P data apart from each other in the one or more reference data streams where P is an integer greater than or equal to 1, and the calculation may be applied in units of Q bits to at least a portion of bit strings included in data parts of packets serving as the reference data where Q is an integer between 1 and 16, inclusive, and the calculating of the plurality of reference distances may include calculating each of the plurality of reference distances by calculating a reference distance for each pair of the reference data that are P data apart from each other in the one or more reference data streams.

Furthermore, the anomaly detection method may further include: calculating, for each of one or more reference data streams made up of a plurality of reference data that are consecutive, a plurality of reference distances between the plurality of reference data; extracting each of a plurality of reference features of the one or more reference data streams using a corresponding one of the plurality of reference distances calculated; and storing, as one of the plurality of reference features that is stored in advance, each of the plurality of reference features extracted.

Furthermore, the calculating of the plurality of reference distances may include calculating each of the plurality of reference distances between limited pairs of reference data that are of an identical type among the plurality of reference data.

An anomaly detection device according to one aspect of the present disclosure includes: a detection target data distance calculator that calculates, for a detection target data stream made up of a plurality of detection target data that are consecutive, a plurality of distances between the plurality of detection target data; a feature extractor that extracts a plurality of features of the detection target data stream using the plurality of distances calculated by the detection target data distance calculator; and an information calculator that calculates anomaly degree information about a degree of anomaly in the detection target data stream using the plurality of features extracted by the feature extractor. The feature extractor extracts the plurality of features each made up of L consecutive distances among the plurality of distances where L is an integer greater than or equal to 2. The information calculator calculates supplementary information, which is used to calculate the anomaly degree information, for each of the plurality of features extracted by the feature extractor, using a difference in the feature, and calculates the anomaly degree information for each of one or more information calculation target windows made up of N detection target data among the plurality of detection target data, using all items of supplementary information calculated from the N detection target data where N is an integer greater than or equal to L+1.

According to this anomaly detection device, a feature of the context of the detection target data stream can be extracted as a feature. Furthermore, information about an anomaly in the detection target data stream can be calculated using the extracted feature. Thus, an anomaly in data streams such as packet streams can be detected using the above anomaly detection device.

Furthermore, the anomaly detection device may further include: a reference data distance calculator that calculates, for each of one or more reference data streams made up of a plurality of reference data that are consecutive, a plurality of reference distances between the plurality of reference data; and a reference feature extractor that extracts each of a plurality of reference features of the one or more reference data streams using a corresponding one of the plurality of reference distances calculated by the reference data distance calculator. The information calculator may calculate the anomaly degree information by further using each of the plurality of reference features extracted by the reference feature extractor.

Hereinafter, specific examples of the anomaly detection method and device according to one aspect of the present disclosure will be described with reference to the drawings. Each embodiment described below shows a specific example of the present disclosure. Thus, the numerical values, shapes, structural elements, and the arrangement and connection of the structural elements, steps, the processing order of the steps etc., shown in the following embodiment are mere examples, and are not intended to limit the present disclosure. Among the structural elements in the following embodiment, structural elements not recited in any one of the independent claims are structural elements that can be arbitrarily included. Note that the figures are schematic diagrams and are not necessarily precise illustrations.

Embodiment

Hereinafter, an anomaly detection device according to an embodiment will be described. This anomaly detection device detects an anomaly in a detection target packet stream.

1. Configuration

FIG. 1 is a block diagram illustrating the configuration of anomaly detection device 1 according to the embodiment.

As illustrated in FIG. 1, anomaly detection device 1 includes first profile determiner 11, first extractor 12, reference packet data stream group storage 13, reference packet data distance calculator 14, reference feature extractor 15, reference feature storage 16, second profile determiner 21, second extractor 22, detection target packet data stream storage 23, detection target packet data distance calculator 24, feature extractor 25, feature storage 26, supplementary information calculator 27, information calculator 28, and determiner 29.

Anomaly detection device 1 is provided, for example, as a computer device including memory and a processor that executes a program stored in the memory. In this case, various functions of anomaly detection device 1 are implemented by the processor included in anomaly detection device 1 executing the program stored in the memory included in anomaly detection device 1.

First profile determiner 11 obtains reference packet stream group 10 which is a group of normal packet streams, in other words, a group of packet streams including no anomalous packet streams. Subsequently, for each packet included in each reference packet stream in obtained reference packet stream group 10, a corresponding profile is determined on the basis of attribute information of the packet. The attribute information is a source IP, a destination IP, a source port, a destination port, a protocol, or the like and also includes a combination thereof. First profile determiner 11 may store profile information and determine the corresponding profile on the basis of the stored profile information, for example.

FIG. 2 is a schematic diagram illustrating one example of the profile information stored in first profile determiner 11.

First profile determiner 11 stores the profile information illustrated in FIG. 2 and determines, for each packet, a profile identified by profile ID in a row with the same target command, for example.

Figure 3:
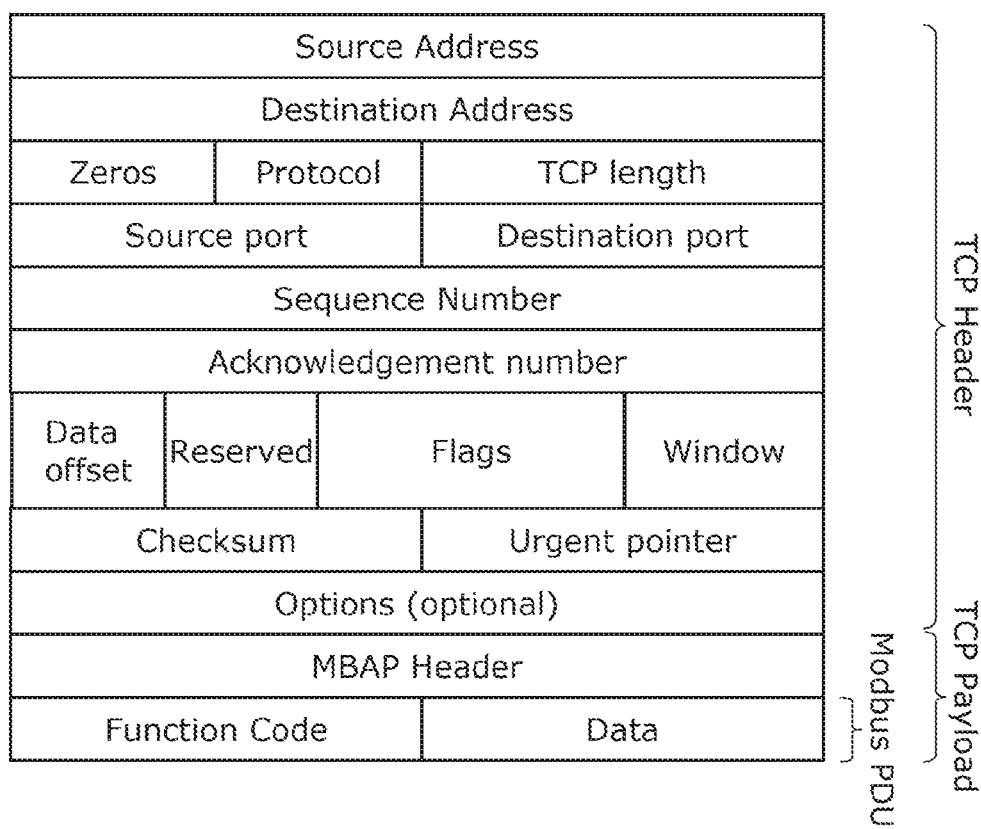
FIG. 3 is a schematic diagram illustrating the data structure of a Modbus/TCP protocol packet.

FIG. 3 is a schematic diagram illustrating the data structure of a Modbus/TCP protocol packet.

For example, in the case where a packet is a Modbus/TCP protocol packet, first profile determiner 11 determines, as a packet with the same target command, a packet in which a bit string stored in the Data field illustrated in FIG. 3 matches a bit string corresponding to the target command.

Figure 4:
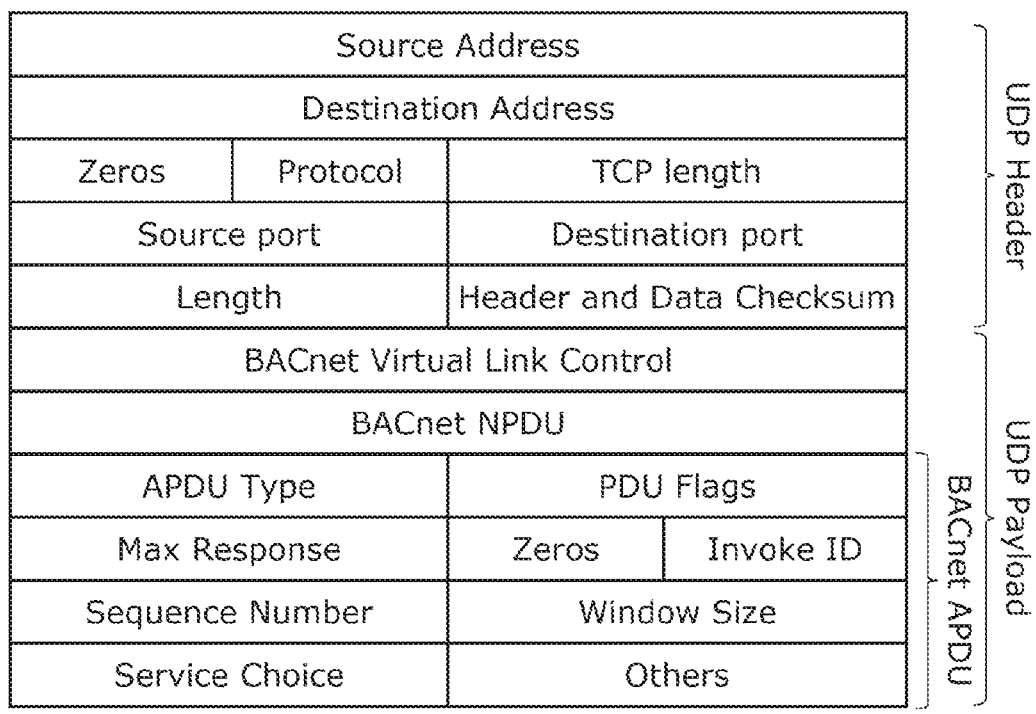
FIG. 4 is a schematic diagram illustrating the data structure of a BACnet/IP protocol packet.

FIG. 4 is a schematic diagram illustrating the data structure of a BACnet/IP protocol packet.

For example, in the case where a packet is a BACnet/IP protocol packet, first profile determiner 11 determines, as a packet with the same target command, a packet in which a bit string stored in the APDU Type field illustrated in FIG. 4 and a bit string stored in the Service Choice field illustrated in FIG. 4 match a bit string corresponding to the target command.

For example, in the case where a packet for which a profile is to be determined does not match the stored profile information, first profile determiner 11 may execute an application including a deep packet inspection function, thereby specify a protocol for the packet, and determine a profile for the packet on the basis of the specified protocol.

Returning to FIG. 1, the description of anomaly detection device 1 will continue.

For each packet the profile of which has been determined by first profile determiner 11, first extractor 12 extracts, as packet data, a bit string stored in the payload field of the packet.

For example, in the case where an extraction target packet is a Modbus/TCP protocol packet, first extractor 12 extracts, as the packet data, a bit string stored in the TCP Payload field illustrated in FIG. 3.

For example, in the case where the extraction target packet is a BACnet/IP protocol packet, first extractor 12 extracts, as the packet data, a bit string stored in the UDP Payload field illustrated in FIG. 4.

When first extractor 12 extracts the packet data from each packet, first extractor 12 outputs a reference packet data stream made up of packet data with the same profile for each reference packet stream obtained by first profile determiner 11.

Figure 5:
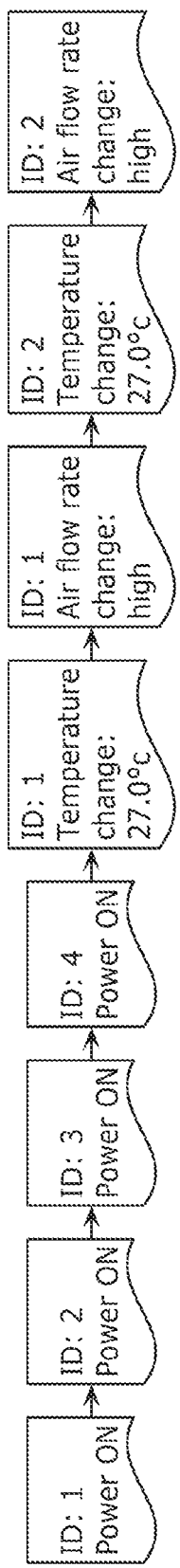
FIG. 5 is a schematic diagram illustrating one example of a reference packet data stream.

FIG. 5 is a schematic diagram illustrating one example of the reference packet data stream output by first extractor 12.

For example, first extractor 12 outputs a reference packet data stream including, in a sequence: packet data corresponding to a write command for "powering ON the device identified by ID=1"; packet data corresponding to a write command for "powering ON the device identified by ID=2"; packet data corresponding to a write command for "powering ON the device identified by ID=3"; packet data corresponding to a write command for "powering ON the device identified by ID=4"; packet data corresponding to a write command for "changing the temperature settings of the device identified by ID=1 to 27.0° C."; packet data corresponding to a write command for "changing the air flow rate settings of the device identified by ID=1 to HIGH"; packet data corresponding to a write command for "changing the temperature settings of the device identified by ID=2 to 27.0° C."; and packet data corresponding to a write command for "changing the air flow rate settings of the device identified by ID=2 to HIGH", which are illustrated in FIG. 5.

Returning to FIG. 1, the description of anomaly detection device 1 will continue.

Reference packet data stream group storage 13 stores a reference packet data stream group made up of one or more reference packet data streams output from first extractor 12.

Reference packet data distance calculator 14 calculates, for each reference packet data stream stored in reference packet data stream group storage 13, a plurality of reference distances between a plurality of reference packet data included in the reference packet data stream.

Reference packet data distance calculator 14 handles the packet data as byte strings cut out on a byte-by-byte basis and calculates a reference distance between the reference packet data by calculating a byte string distance between the reference packet data.

Figure 6:
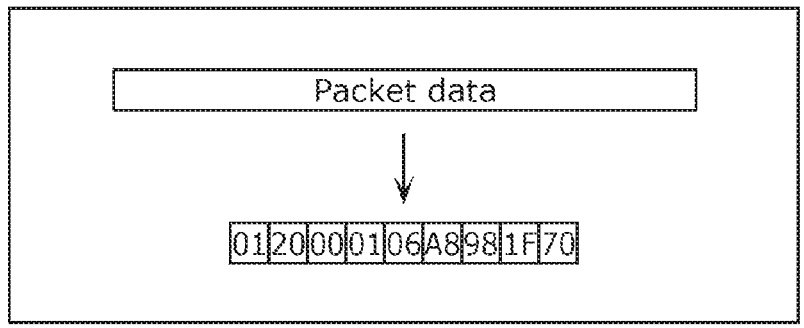
FIG. 6 is a schematic diagram illustrating one example where a reference packet data distance calculator according to an embodiment cuts out packet data on a byte-by-byte basis.

FIG. 6 is a schematic diagram illustrating one example where reference packet data distance calculator 14 cuts out the packet data on a byte-by-byte basis.

Note that reference packet data distance calculator 14 is described herein as cutting out the packet data on a byte-by-byte basis, but the unit to be cut out does not necessarily need to be limited to the example of the byte-by-byte basis. The unit to be cut out may be a bit string having an arbitrary length between 1 bit and 16 bits, inclusive, or may be a bit string having another arbitrary length, for example. In addition, reference packet data distance calculator 14 does not need to be limited to an example of cutting out the packet data in units of consecutive bits. For example, reference packet data distance calculator 14 may cut out a bit string by repeating the process of cutting out x bits and skipping y bits.

Returning to FIG. 1, the description of anomaly detection device 1 will continue.

Reference packet data distance calculator 14 calculates a reference distance using the Levenshtein distance between the packet data.

The Levenshtein distance is a distance that can be set between two character strings or byte strings. The Levenshtein distance is defined as the minimum number of times required to modify one character string or byte string into the other character string or byte string by way of insertions, deletions, and substitutions of one character or one byte.

Figure 7:
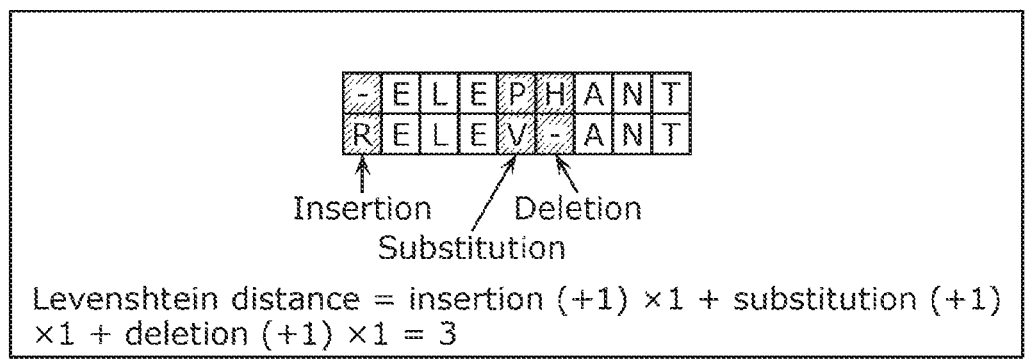
FIG. 7 is a schematic diagram illustrating one example where a reference packet data distance calculator according to an embodiment calculates the Levenshtein distance between two character strings.

FIG. 7 is a schematic diagram illustrating one example where reference packet data distance calculator 14 calculates the Levenshtein distance between two character strings (here, as an example, between the character strings "ELEPHANT" and "RELEVANT").

As illustrated in FIG. 7, the minimum number of times of insertions, deletions, and substitutions required to modify "ELEPHANT" into "RELEVANT" is three. Therefore, reference packet data distance calculator 14 calculates the Levenshtein distance between "ELEPHANT" and "RELEVANT" as "3".

Figure 8:
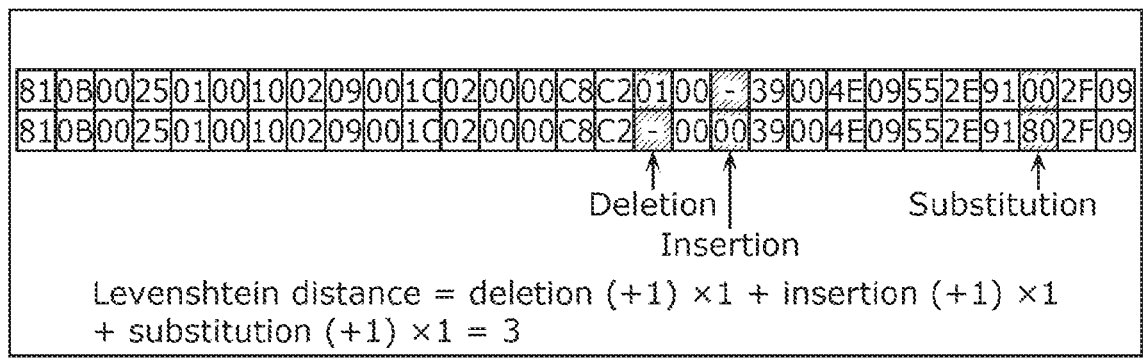
FIG. 8 is a schematic diagram illustrating one example where a reference packet data distance calculator according to an embodiment calculates the Levenshtein distance between two byte strings.

FIG. 8 is a schematic diagram illustrating one example where reference packet data distance calculator 14 calculates the Levenshtein distance between two byte strings.

As illustrated in FIG. 8, the minimum number of times of insertions, deletions, and substitutions required to modify one byte string into the other byte string is three. Therefore, reference packet data distance calculator 14 calculates, as "3", the Levenshtein distance between the byte strings illustrated in FIG. 8.

Reference packet data distance calculator 14 calculates, for each pair of reference packet data that are P data apart from each other (P is an integer greater than or equal to 1), a plurality of reference distances between a plurality of reference packet data included in the reference packet data stream.

Figure 9:
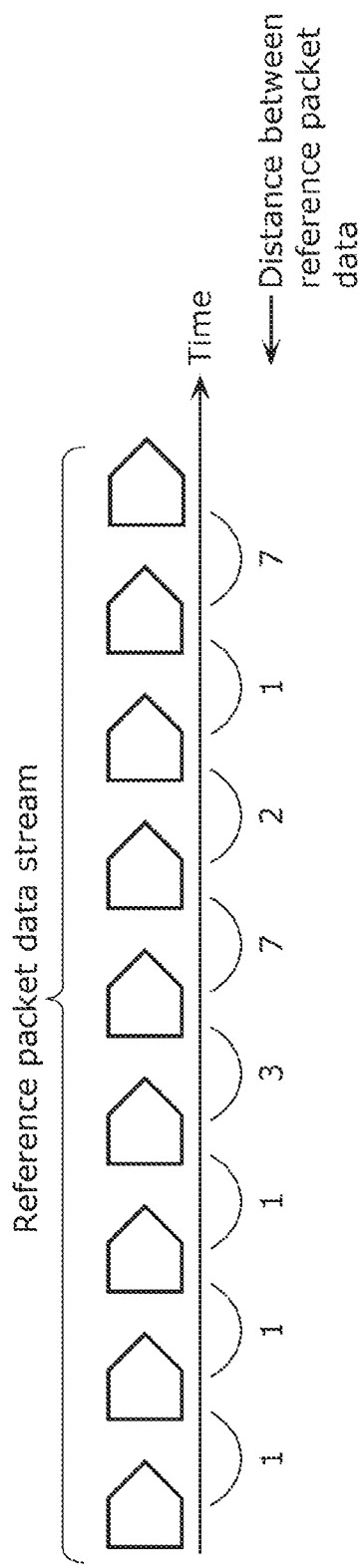
FIG. 9 is a schematic diagram illustrating one example where a reference packet data distance calculator according to an embodiment calculates a reference distance.

FIG. 9 is a schematic diagram illustrating one example where reference packet data distance calculator 14 calculates the plurality of reference distances from the reference packet data stream when P is 1. Although P is described as being 1 herein, P is not necessarily limited to 1.

As illustrated in FIG. 9, in the case where a current reference packet data stream is made up of nine consecutive reference packet data, reference packet data distance calculator 14 calculates eight reference distances between reference packet data that are one data apart from each other, in other words, between reference packet data adjacent to each other, from the current reference packet data stream.

It is sufficient that reference packet data distance calculator 14 calculate, as the Levenshtein distance between the packet data, the Levenshtein distance for each pair of at least some of bit strings included in the packet data; reference packet data distance calculator 14 does not necessarily need to calculate the Levenshtein distance for every pair of the bit strings included in the packet data.

Returning to FIG. 1, the description of anomaly detection device 1 will continue.

For each reference packet data stream stored in reference packet data stream group storage 13, reference feature extractor 15 extracts a reference feature using a corresponding one of the plurality of reference distances calculated by reference packet data distance calculator 14. More specifically, for each reference packet data stream stored in reference packet data stream group storage 13, reference feature extractor 15 calculates a reference distance stream made up of L reference distances calculated for pairs of reference packet data belonging to each of one or more supplementary information calculation target windows made up of L+1 consecutive reference packet data (L is the length of the supplementary information calculation target window and is an integer greater than or equal to 2), and extracts each calculated reference distance stream as a reference feature.

Figure 10:
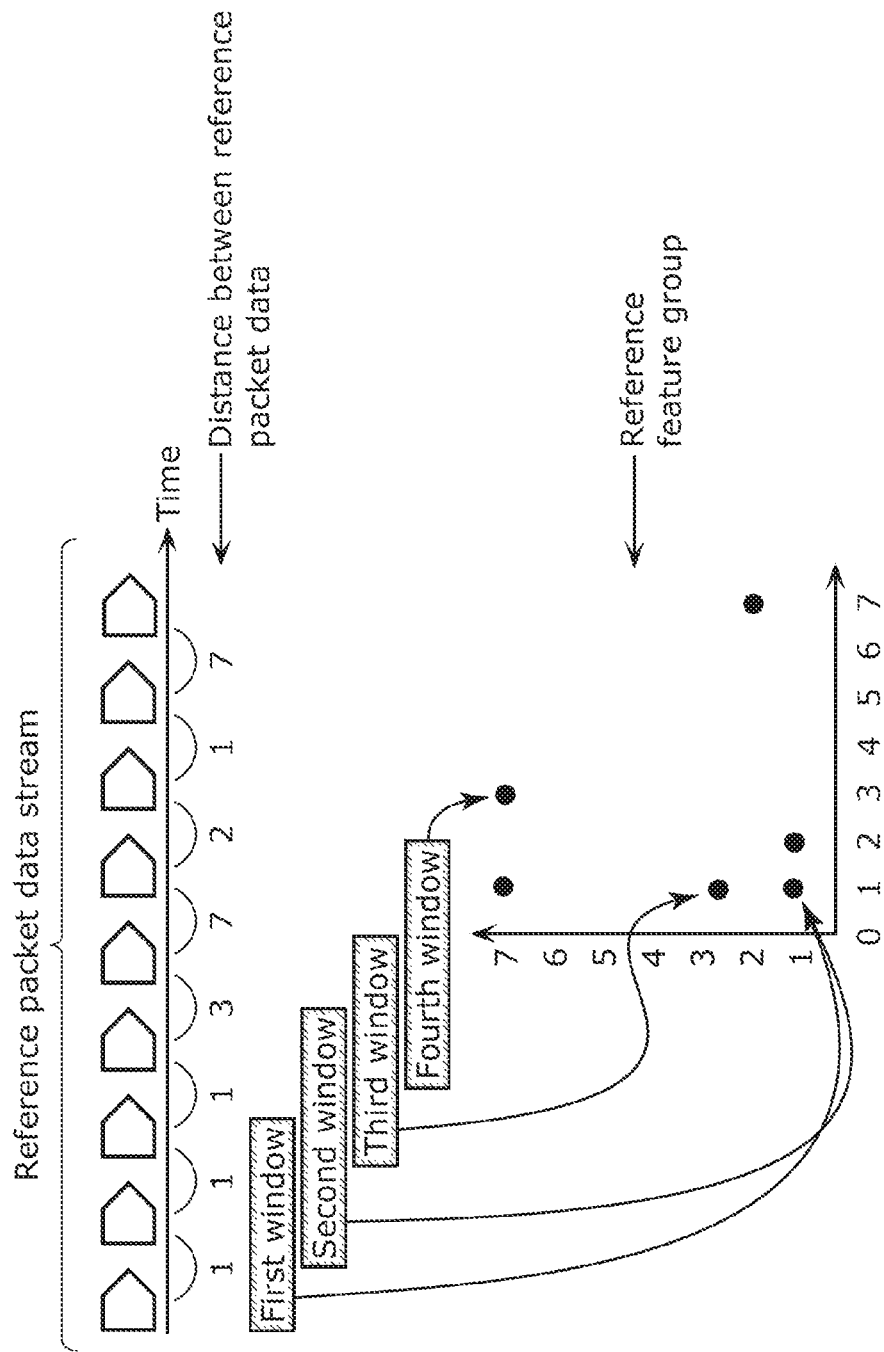
FIG. 10 is a schematic diagram illustrating one example where a reference feature extractor according to an embodiment extracts a reference feature.

FIG. 10 is a schematic diagram illustrating one example where reference feature extractor 15 extracts a reference feature from one reference packet data stream. The schematic diagram in FIG. 10 illustrates the case where reference packet data distance calculator 14 calculates the plurality of reference distances illustrated in FIG. 9 for one reference packet data stream when L is 2.

As illustrated in FIG. 10, the reference distances calculated for pairs of reference packet data belonging to a first supplementary information calculation target window are "1" and "1". Therefore, reference feature extractor 15 extracts the feature of the first supplementary information calculation target window as two-dimensional vector A1 that is specifically (1, 1). The reference distances calculated for pairs of reference packet data belonging to a second supplementary information calculation target window are "1" and "1". Therefore, reference feature extractor 15 extracts the feature of the second supplementary information calculation target window as two-dimensional vector B1 that is specifically (1, 1). The reference distances calculated for pairs of reference packet data belonging to a third supplementary information calculation target window are "1" and "3". Therefore, reference feature extractor 15 extracts the feature of the third supplementary information calculation target window as two-dimensional vector C1 that is specifically (1, 3). The reference distances calculated for pairs of reference packet data belonging to a fourth supplementary information calculation target window are "3" and "7". Therefore, reference feature extractor 15 extracts the feature of the fourth supplementary information calculation target window as two-dimensional vector D1 that is specifically (3, 7). Reference feature extractor 15 extracts calculated vectors A1, B1, C1, D1 as the reference features.

Here, since vector A1 and vector B1 are the same, only one of the vectors, for example, vector A1, may be extracted as the reference feature.

In substantially the same manner, reference feature extractor 15 extracts, as the reference features, vector E1 (7, 2) of a fifth supplementary information calculation target window, vector F1 (2, 1) of a sixth supplementary information calculation target window, and vector G1 (1, 7) of a seventh supplementary information calculation target window.

Returning to FIG. 1, the description of anomaly detection device 1 will continue.

Reference feature storage 16 stores the reference features extracted by reference feature extractor 15.

Second profile determiner 21 obtains detection target packet stream 20 which is subject to anomaly detection. Subsequently, for each packet included in obtained detection target packet stream 20, a corresponding profile is determined on the basis of attribute information. The attribute information is a source IP, a destination IP, a source port, a destination port, a protocol, or the like and also includes a combination thereof. Second profile determiner 21 determines a profile using an algorithm that is substantially the same as that used in the profile determination performed by first profile determiner 11.

For each of a plurality of packets the profiles of which have been determined by second profile determiner 21, second extractor 22 extracts, as packet data, a bit string stored in the payload field of the packet. Second extractor 22 extracts the packet data using an algorithm that is substantially the same as that used in the packet data extraction performed by first extractor 12.

When second extractor 22 extracts the packet data, second extractor 22 outputs a detection target packet data stream made up of packet data having the same profile.

Detection target packet data stream storage 23 stores the detection target packet data stream output from second extractor 22.

For the detection target packet data stream stored in detection target packet data stream storage 23, detection target packet data distance calculator 24 calculates a plurality of distances between a plurality of detection target packet data included in the detection target packet data stream.

Detection target packet data distance calculator 24 calculates a distance using an algorithm that is substantially the same as an algorithm resulting from replacing the reference packet by a detection target packet, replacing the reference packet data by detection target packet data, replacing the reference packet data stream by a detection target packet data stream, and replacing the reference distance by a distance, as compared to the reference distance calculation performed by reference packet data distance calculator 14.

Figure 11:
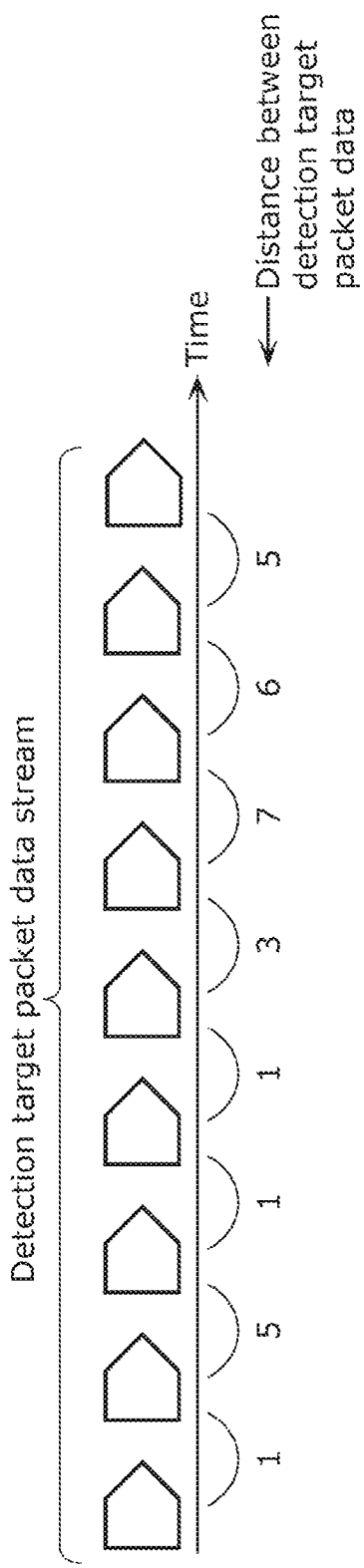
FIG. 11 is a schematic diagram illustrating one example where a detection target packet data distance calculator according to an embodiment calculates a distance.

FIG. 11 is a schematic diagram illustrating one example where detection target packet data distance calculator 24 calculates a plurality of distances from the detection target packet data stream when P is 1. Although P is described as being 1 herein, P is not necessarily limited to 1.

As illustrated in FIG. 11, in the case where a current detection target packet data stream is made up of nine consecutive detection target packet data, detection target packet data distance calculator 24 calculates eight distances between detection target packet data that are one data apart from each other, in other words, between detection target packet data adjacent to each other, from the current detection target packet data stream.

It is sufficient that detection target packet data distance calculator 24 calculate, as the Levenshtein distance between the packet data, the Levenshtein distance for each pair of at least some of bit strings included in the packet data; detection target packet data distance calculator 24 does not necessarily need to calculate the Levenshtein distance for every pair of the bit strings included in the packet data.

Returning to FIG. 1, the description of anomaly detection device 1 will continue.

For the detection target packet data stream stored in detection target packet data stream storage 23, feature extractor 25 extracts a feature using the plurality of distances calculated by detection target packet data distance calculator 24. More specifically, for the detection target packet data stream stored in detection target packet data stream storage 23, feature extractor 25 calculates a distance stream made up of L distances calculated for pairs of detection target packet data belonging to each of one or more supplementary information calculation target windows made up of L+1 consecutive detection target packet data, and extracts each calculated distance stream as a feature.

Figure 12:
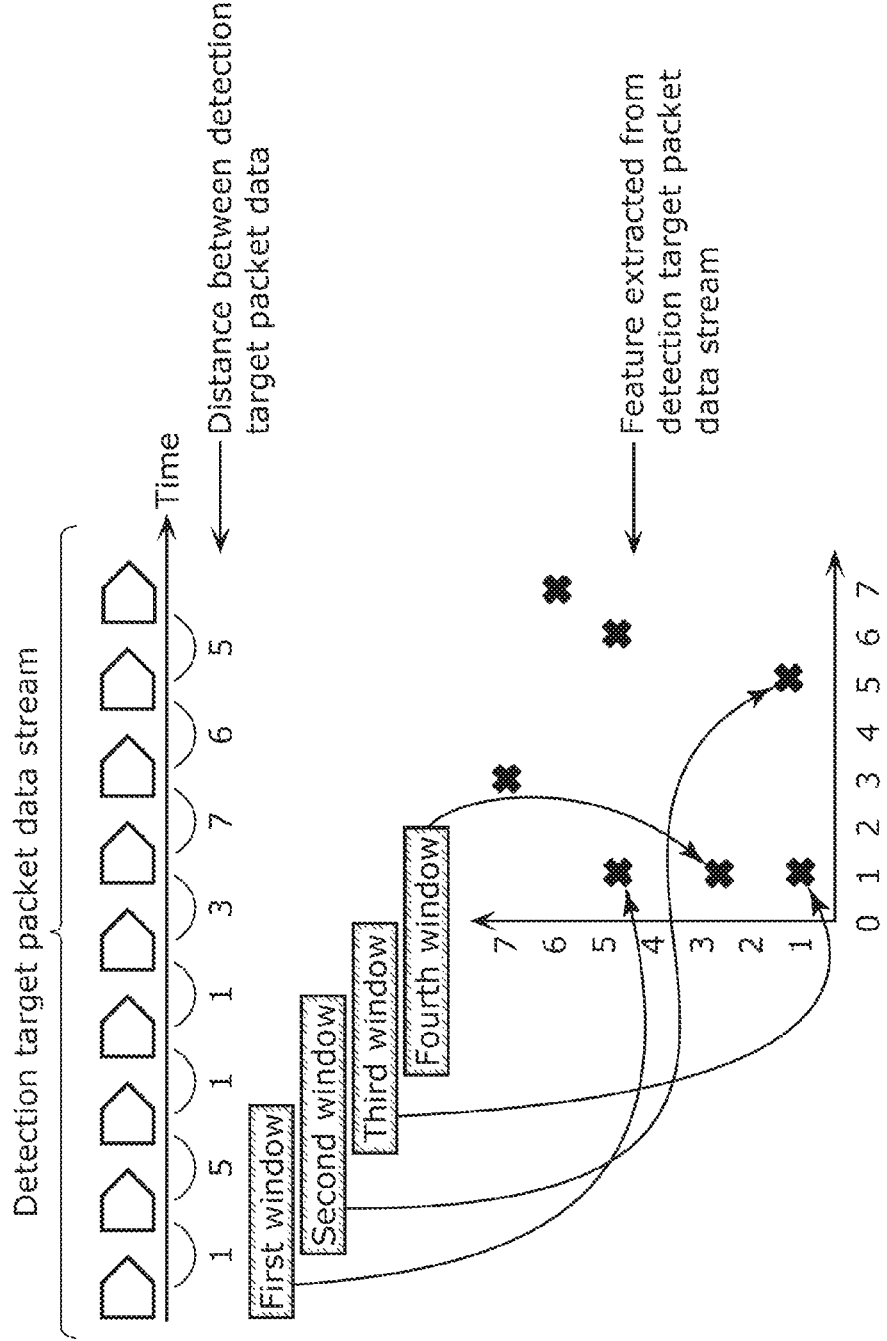
FIG. 12 is a schematic diagram illustrating one example where a feature extractor according to an embodiment extracts a feature from a detection target packet data stream.

FIG. 12 is a schematic diagram illustrating one example where feature extractor 25 extracts a feature from a detection target packet data stream. The schematic diagram in FIG. 12 illustrates the case where detection target packet data distance calculator 24 calculates the plurality of distances illustrated in FIG. 11 for the detection target packet data stream when L is 2.

As illustrated in FIG. 12, the distances calculated for pairs of detection target packet data belonging to the first supplementary information calculation target window are "1" and "5". Therefore, feature extractor 25 extracts the feature of the first supplementary information calculation target window as two-dimensional vector A2 that is specifically (1, 5). The distances calculated for pairs of detection target packet data belonging to the second window are "5" and "1". Therefore, feature extractor 25 extracts the feature of the second supplementary information calculation target window as two-dimensional vector B2 that is specifically (5, 1). The distances calculated for pairs of detection target packet data belonging to the third supplementary information calculation target window are "1" and "1". Therefore, feature extractor 25 extracts the feature of the third supplementary information calculation target window as two-dimensional vector C2 that is specifically (1, 1). The distances calculated for pairs of detection target packet data belonging to the fourth supplementary information calculation target window are "1" and "3". Therefore, feature extractor 25 extracts the feature of the fourth supplementary information calculation target window as two-dimensional vector D2 that is specifically (1, 3). Feature extractor 25 extracts calculated vectors A2, B2, C2, D2 as the features.

In substantially the same manner, feature extractor 25 extracts, as the features, vector E2 (3, 7) of the fifth supplementary information calculation target window, vector F2 (7, 6) of the sixth supplementary information calculation target window, and vector G2 (6, 5) of the seventh supplementary information calculation target window.

Returning to FIG. 1, the description of anomaly detection device 1 will continue.

Feature storage 26 stores the features extracted by feature extractor 25.

Supplementary information calculator 27 calculates the Lp distance between each of the features stored in feature storage 26 and each of the reference features stored in reference feature storage 16 and calculates the k-nearest neighbor distance between each of the features stored in feature storage 26 and the reference feature stored in reference feature storage 16, as supplementary information, using a k-nearest neighbor algorithm in which the calculated Lp distance is used.

The Lp distance, which is a distance defined between vectors of two actual real numbers having the same dimensionality, can be determined by calculating a p-norm which is the difference between the two vectors.

Calculation expressions indicating how to determine the p-norm (p>0) of vector x are Expression 1 and Expression 2 indicated below.

When p≥1,

[Math. 1]

$$\|x\|_p = (|x_1|^p + |x_2|^p + \cdots + |x_n|^p)^{\frac{1}{p}} \quad \text{Expression 1}$$

When $0 < p < 1$,

[Math. 2]

$$\|x\|_p = |x_1|^p + |x_2|^p + \cdots + |x_n|^p \quad \text{Expression 2}$$

As indicated in Expression 1 and Expression 2, the p-norm (p>0) of vector x is calculated by different calculation expressions for when p is greater than or equal to 1 and when p is less than 1.

As indicated in Expression 1, when p is greater than or equal to 1, the p-norm of vector x is the p-th root of the sum of values obtained by raising the absolute values of the components of x to the p-th power. As indicated in Expression 2, when p is less than 1, the p-norm of vector x is the sum of values obtained by raising the absolute values of the components of x to the p-th power.

A calculation expression indicating how to determine the Lp distance between two vectors x, y having the same dimensionality is Expression 3 indicated below.

[Math. 3]

$$L_p(x,y) = \|x-y\|_p \quad \text{Expression 3}$$

As indicated in Expression 3, the Lp distance between two vectors x, y having the same dimensionality is the p-norm of a vector (x, y).

Figure 13:
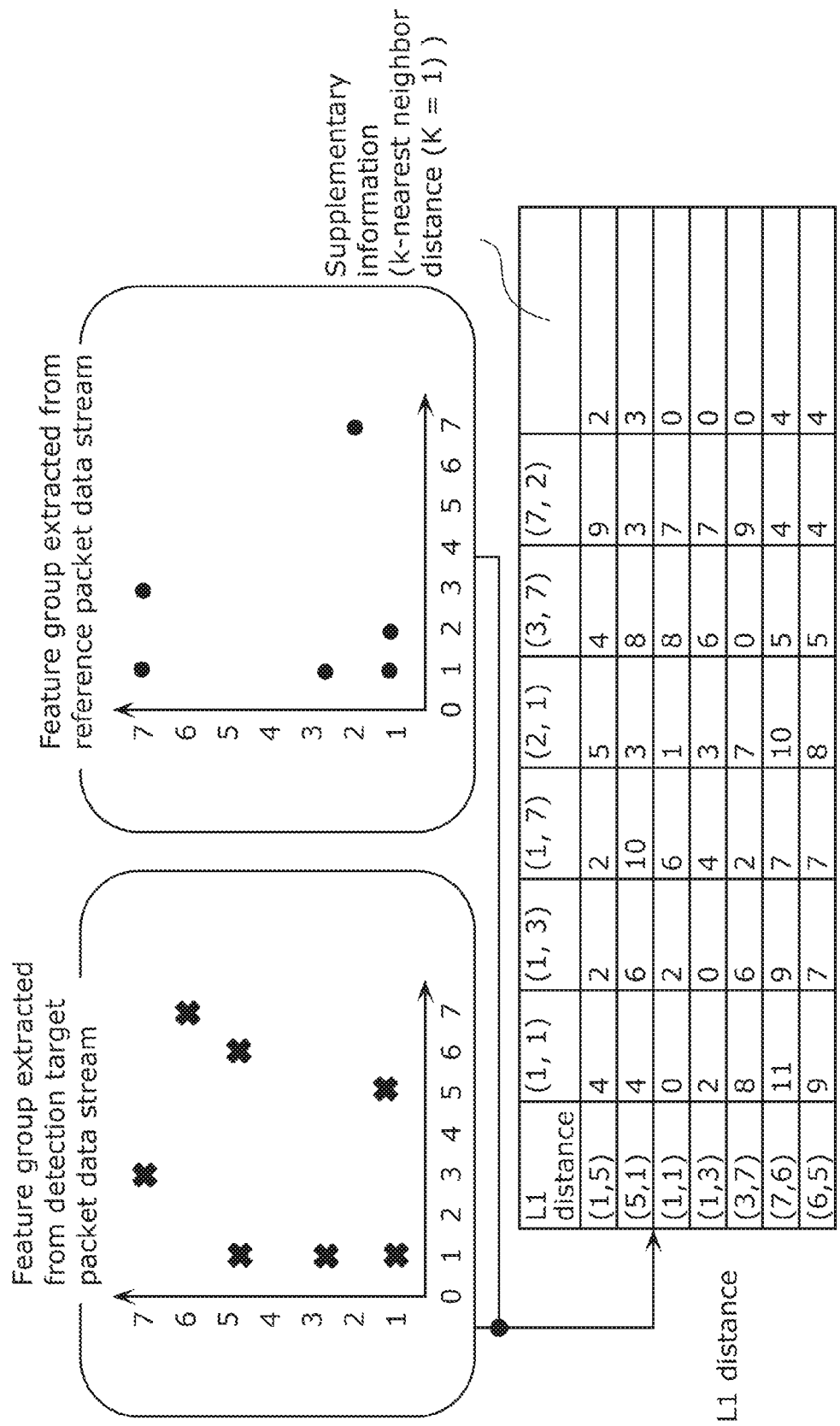
FIG. 13 is a schematic diagram illustrating one example where a supplementary information calculator according to an embodiment calculates supplementary information for a detection target packet stream.

FIG. 13 is a schematic diagram illustrating one example where supplementary information calculator 27 calculates the Lp distance between each of the features stored in feature storage 26 and each of the reference features stored in reference feature storage 16 and calculates the k-nearest neighbor distance between each of the features stored in feature storage 26 and the feature stored in reference feature storage 16, as the supplementary information, using the k-nearest neighbor algorithm in which the calculated Lp distance is used.

The schematic diagram in FIG. 13 illustrates the case where the features stored in feature storage 26 as the distance streams are (1, 5), (5, 1), (1, 1), (1, 3), (3, 7), (7, 6), and (6, 5) and the reference features stored in reference feature storage 16 as the reference distance streams are (1, 1), (1, 3), (1, 7), (2, 1), (3, 7), and (7, 2) when length L of the supplementary information calculation target window is 2 and p is 1.

As illustrated in FIG. 13, supplementary information calculator 27 calculates the L1 distance between the distance stream (1, 5) and the distance stream (1, 1) to be 4, calculates the L1 distance between the distance stream (1, 5) and the distance stream (1, 3) to be 2, calculates the L1 distance between the distance stream (1, 5) and the distance stream (1, 7) to be 2, calculates the L1 distance between the distance stream (1, 5) and the distance stream (2, 1) to be 5, calculates the L1 distance between the distance stream (1, 5) and the distance stream (3, 7) to be 4, and calculates the L1 distance between the distance stream (1, 5) and the distance stream (7, 2) to be 9.

Furthermore, using the k-nearest neighbor algorithm where K=1, supplementary information calculator 27 calculates, as the supplementary information, the k-nearest neighbor distance "2" between the feature that is specifically the distance stream (1, 5) and the reference feature stored in reference feature storage 16. In other words, supplementary information calculator 27 calculates "2" as the supplementary information for the feature that is the distance stream (1, 5).

Similarly, supplementary information calculator 27 calculates "3" as the supplementary information for the feature that is the distance stream (5, 1), calculates "0" as the supplementary information for the feature that is the distance stream (1, 1), calculates "0" as the supplementary information for the feature that is the distance stream (1, 3), calculates "0" as the supplementary information for the feature that is the distance stream (3, 7), calculates "4" as the supplementary information for the feature that is the distance stream (7, 6), and calculates "4" as the supplementary information for the feature that is the distance stream (6, 5).

Returning to FIG. 1, the description of anomaly detection device 1 will continue.

For each of one or more information calculation target windows made up of N detection target packet data (N is the length of the information calculation target window and is an integer greater than or equal to L+1), information calculator 28 calculates anomaly degree information about the degree of anomaly in detection target packet stream 20 using the entire W supplementary information items (W=N−L+1) calculated from the N detection target packet data. More specifically, information calculator 28 calculates anomaly degree information by calculating the sum of all the W consecutive supplementary information items.

In the example of the schematic diagram illustrated in FIG. 13, W=5−2+1=4 where N is 5. Therefore, information calculator 28 calculates the sum of four supplementary information items as the anomaly degree information. In other words, information calculator 28 calculates anomaly degree information that is 2+3+0+0=5, anomaly degree information that is 3+0+0+0=3, anomaly degree information that is 0+0+0+4=4, and anomaly degree information that is 0+0+4+4=8.

Returning to FIG. 1, the description of anomaly detection device 1 will continue.

On the basis of the anomaly degree information of detection target packet stream 20 that has been calculated by information calculator 28, determiner 29 determines whether or not detection target packet stream 20 is anomalous. Subsequently, determiner 29 outputs the determination result to the outside of determiner 29. For example, determiner 29 may store a threshold value, and when any one item of the anomaly degree information of detection target packet stream 20 is greater than or equal to the threshold value, determiner 29 may determine that detection target packet stream 20 is anomalous, and when every item of the anomaly degree information of detection target packet stream 20 is less than the threshold value, determiner 29 may determine that detection target packet stream 20 is not anomalous. Furthermore, determiner 29 may store, for each profile that is subject to the determination of first profile determiner 11 and second file profile determiner 21, a threshold value that is a mutually independent value, and may perform the above determination using the threshold value corresponding to the profile of a detection target packet extracted from detection target packet stream 20.

2. Operations

Anomaly detection device 1 having the above configuration performs the reference feature extraction process and the anomaly detection process. These processes will be described below with reference to the drawings.

First, the reference feature extraction process will be described.

The reference feature extraction process is a process of extracting a reference feature from reference packet stream group 10. For example, when a user of anomaly detection device 1 operates anomaly detection device 1 to start the reference feature extraction process, the reference feature extraction process starts.

Figure 14:
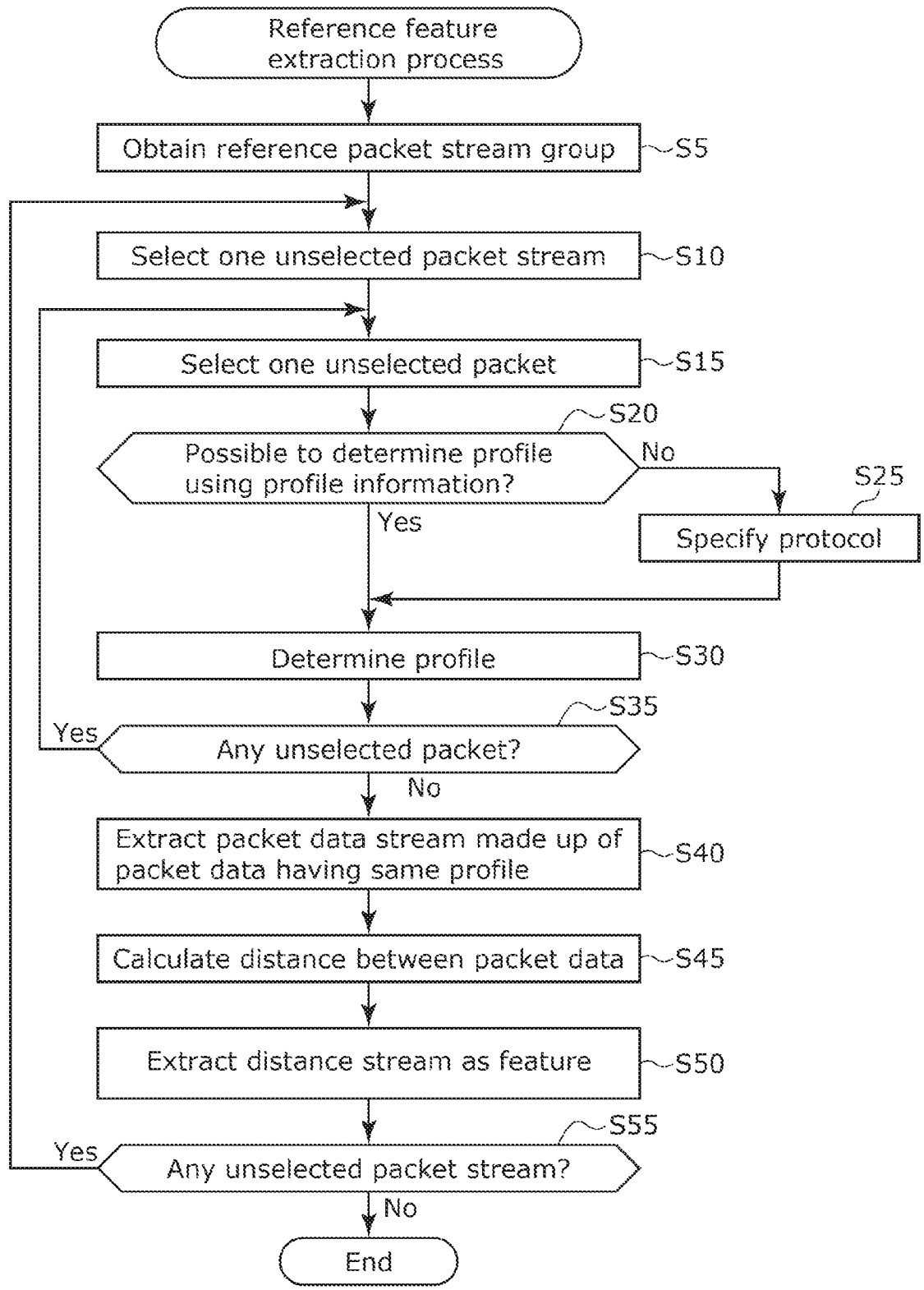
FIG. 14 is a flowchart of a reference feature extraction process.

FIG. 14 is a flowchart of the reference feature extraction process.

When the reference feature extraction process starts, first profile determiner 11 obtains reference packet stream group 10 (Step S5).

When first profile determiner 11 obtains reference packet stream group 10, first profile determiner 11 selects one unselected reference packet stream from among reference packet streams included in reference packet stream group 10 (Step S10). Here, the unselected reference packet stream means a reference packet stream that has not been selected in the past process in Step S10 throughout the loop process from the process in Step S10 to the Yes process in Step S55 (described later).

When first profile determiner 11 selects one unselected reference packet stream, first profile determiner 11 selects one unselected packet from among packets included in the selected reference packet stream (Step S15). Here, the unselected packet means a packet that has not been selected in the past process in Step S15 throughout the loop process from the process in Step S15 to the Yes process in Step S35 (described later).

When first profile determiner 11 selects one packet, first profile determiner 11 checks whether or not the profile of the selected packet can be determined using the stored profile information (Step S20).

When the profile of the selected packet can be determined using the stored profile information in the process in Step S20 (Step S20: Yes), first profile determiner 11 determines the profile of the selected packet using the stored profile information (Step S30).

When the profile of the selected packet cannot be determined using the stored profile information in the process in Step S20 (Step S20: No), first profile determiner 11 specifies a protocol for the selected packet by executing an application including a deep packet inspection function (Step S25). Subsequently, first profile determiner 11 determines the profile of the selected packet on the basis of the specified protocol (Step S30).

When first profile determiner 11 determines the profile of the selected packet, first profile determiner 11 checks whether or not the packets included in the selected reference packet stream include an unselected packet (Step S35).

When there is an unselected packet in the process in Step S35 (Step S35: Yes), the reference feature extraction process returns to the process in Step S15.

When there is no unselected packet in the process in Step S35 (Step S35: No), first extractor 12 extracts, as packet data, a bit string stored in the payload field of each packet the profile of which has been determined by first profile determiner 11. Subsequently, first extractor 12 extracts a reference packet data stream made up of packet data having the same profile (Step S40). Furthermore, reference packet data stream group storage 13 stores the reference packet data stream extracted by first extractor 12.

When the reference packet data stream is extracted, reference packet data distance calculator 14 calculates a plurality of reference distances between a plurality of reference packet data included in the reference packet data stream (Step S45).

When the plurality of reference distances are calculated, reference feature extractor 15 extracts, as a reference feature, the reference distance stream for each supplementary information calculation target window from the plurality of calculated reference distances (Step S50). Subsequently, reference feature storage 16 stores the reference distance stream extracted by reference feature extractor 15 as the reference feature.

When the reference distance stream is extracted, first profile determiner 11 checks whether or not obtained reference packet stream group 10 includes an unselected reference packet stream (Step S55).

When there is an unselected reference packet stream in the process in Step S55 (Step S55: Yes), the reference feature extraction process returns to the process in Step S10.

When there is no unselected reference packet stream in the process in Step S55 (Step S55: No), the reference feature extraction process ends.

Next, the anomaly detection process will be described.

The anomaly detection process is a process of detecting an anomaly in detection target packet stream 20. For example, when a user of anomaly detection device 1 operates anomaly detection device 1 to start the anomaly detection process, the anomaly detection process starts.

Figure 15:
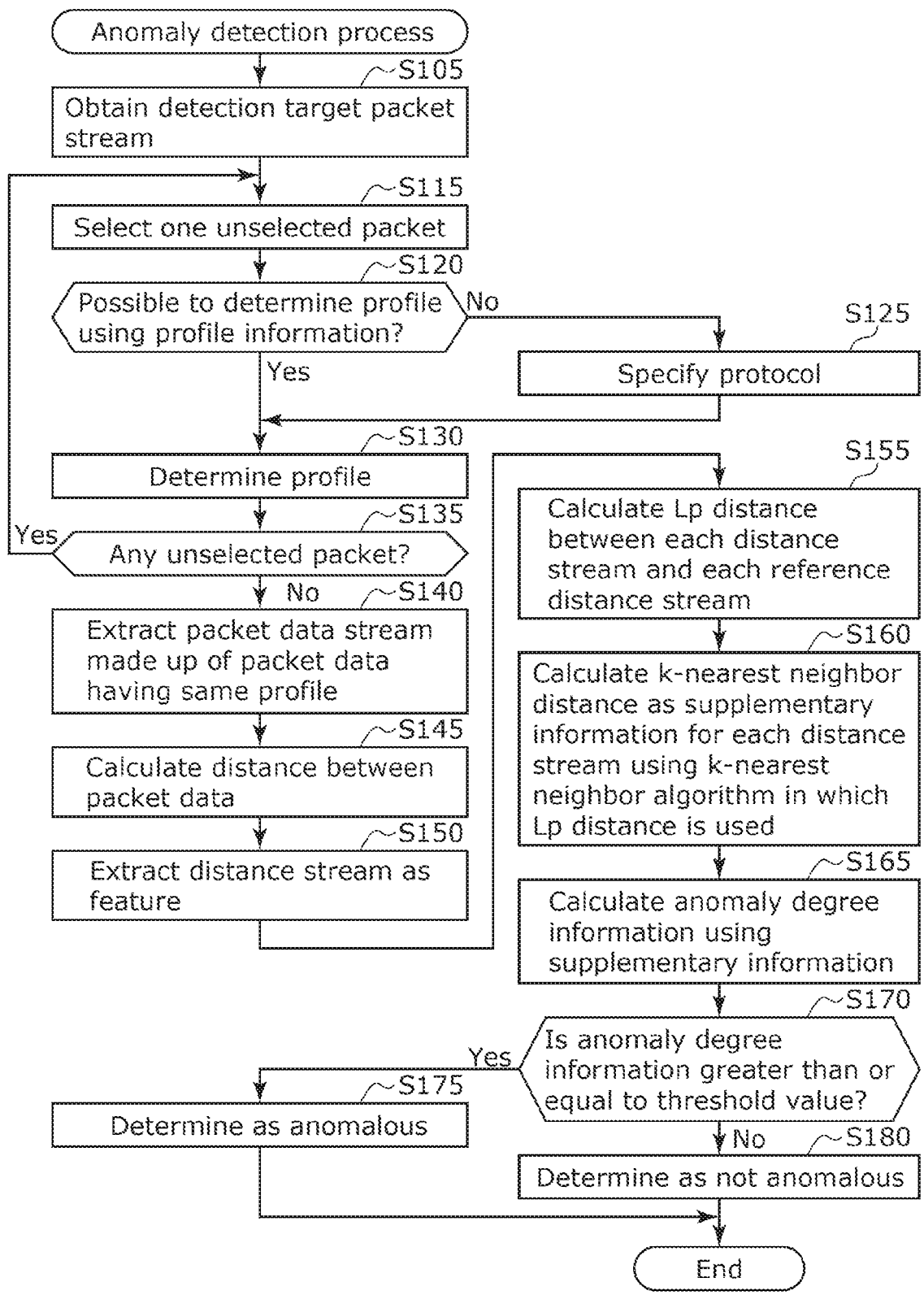
FIG. 15 is a flowchart of an anomaly detection process.

FIG. 15 is a flowchart of the anomaly detection process.

When the anomaly detection process starts, second profile determiner 21 obtains detection target packet stream 20 (Step S105).

When second profile determiner 21 obtains detection target packet stream 20, second profile determiner 21 selects one unselected packet from among packets included in detection target packet stream 20 obtained (Step S115). Here, the unselected packet means a packet that has not been selected in the past process in Step S115 throughout the loop process from the process in Step S115 to the Yes process in Step S135 (described later).

When second profile determiner 21 selects one packet, second profile determiner 21 checks whether or not the profile of the selected packet can be determined using the stored profile information (Step S120).

When the profile of the selected packet can be determined using the stored profile information in the process in Step S120 (Step S120: Yes), second profile determiner 21 determines the profile of the selected packet using the stored profile information (Step S130).

When the profile of the selected packet cannot be determined using the stored profile information in the process in Step S120 (Step S120: No), second profile determiner 21 specifies a protocol for the selected packet by executing an application including a deep packet inspection function (Step S125). Subsequently, second profile determiner 21 determines the profile of the selected packet on the basis of the specified protocol (Step S130).

When second profile determiner 21 determines the profile of the selected packet, second profile determiner 21 checks whether or not the packets included in detection target packet stream 20 obtained include an unselected packet (Step S135).

When there is an unselected packet in the process in Step S135 (Step S135: Yes), the anomaly detection process returns to the process in Step S115.

When there is no unselected packet in the process in Step S135 (Step S135: No), second extractor 22 extracts, as packet data, a bit string stored in the payload field of each packet the profile of which has been determined by second profile determiner 21. Subsequently, second extractor 22 extracts a detection target packet data stream made up of packet data having the same profile (Step S140). Furthermore, detection target packet data stream group storage 23 stores the detection target packet data stream extracted by second extractor 22.

When the detection target packet data stream is extracted, detection target packet data distance calculator 24 calculates a plurality of distances between a plurality of detection target packet data included in the detection target packet data stream (Step S145).

When the plurality of distances are calculated, feature extractor 25 extracts, as a feature, the distance stream for each supplementary information calculation target window from the plurality of calculated distances (Step S150). Subsequently, feature storage 26 stores the distance stream extracted by feature extractor 25 as the feature.

When the distance stream is extracted, supplementary information calculator 27 calculates the Lp distance between each extracted distance stream and each of the reference distance streams stored in reference feature storage 16 as the reference feature (Step S155) and calculates the k-nearest neighbor distance as the supplementary information using the k-nearest neighbor algorithm in which the calculated Lp distance is used (Step S160).

When the supplementary information is calculated, information calculator 28 calculates the sum of W consecutive supplementary information items for each information calculation target window as the anomaly degree information (Step S165).

When each anomaly degree information is calculated, determiner 29 checks whether or not the calculated anomaly degree information is greater than or equal to the stored threshold value (Step S170).

When any one item of the calculated anomaly degree information is greater than or equal to the stored threshold value in the process in Step S170 (Step S170: Yes), determiner 29 determines that detection target packet stream 20 is anomalous (Step S175), and outputs, to the outside of determiner 29, a signal indicating that detection target packet stream 20 is anomalous.

When every item of the calculated anomaly degree information is not greater than or equal to the stored threshold value in the process in Step S170 (Step S170: No), determiner 29 determines that detection target packet stream 20 is not anomalous (Step S180), and outputs, to the outside of determiner 29, a signal indicating that detection target packet stream 20 is not anomalous.

When the process in Step S175 ends and when the process in Step S180 ends, the anomaly detection process ends.

3. Review

Anomaly detection device 1 having the above-described configuration performs the reference feature extraction process and thus extracts, as the reference feature, a feature of the context of a normal packet stream from reference packet stream group 10 made up of normal packet streams, and stores the reference feature. Subsequently, anomaly detection device 1 performs the anomaly detection process and thus extracts a feature of the context of detection target packet stream 20 as the feature from detection target packet stream 20, calculates anomaly degree information indicating the degree of deviation of the extracted feature from the stored reference feature, and determines, on the basis of the calculated anomaly degree information, whether or not detection target packet stream 20 is anomalous. Thus, an anomaly in detection target packet stream 20 can be detected using anomaly detection device 1.

Furthermore, by calculating the anomaly degree information using the aforementioned supplementary information, it is possible to obtain the following advantageous effects, for example.

Specifically, the advantageous effects are: (A) a decrease in the score of the anomaly degree information when a transition similar to that in reference packet stream group 10 occurs in detection target packet stream 20; (B) a decrease in the score of the anomaly degree information when a transition that is less likely to occur, but is expected to surely occur occurs in detection target packet stream 20; and (C) an increase in the score of the anomaly degree information when a transition that has never occurred in reference packet stream group 10 occurs in detection target packet stream 20, because the anomaly of this event can be quantified using the Lp distance.

Additional Comments

As described above, the embodiment is presented as an exemplification of the technique disclosed in the present application. However, the technique in the present disclosure is not limited to those described above, and is also applicable to an embodiment obtained by carrying out modification, substitution, addition, omission, etc., as necessary.

Examples of a variation of the present disclosure include the following.

(1) The embodiment describes an example in which anomaly detection device 1 is configured so that determiner 29 determines whether or not detection target packet stream 20 is anomalous, and outputs the result of determination to the outside of determiner 29. Regarding this feature, as another configuration example, anomaly detection device 1 may be configured so that information calculator 28 calculates an anomaly degree indicating the degree of anomaly in detection target packet stream 20 and outputs the calculated anomaly degree to the outside of information calculator 28. In this case, anomaly detection device 1 may be configured to not include determiner 29.

(2) The embodiment describes an example in which anomaly detection device 1 is configured to perform the reference feature extraction process and thus extract a reference feature and store the extracted reference feature in reference feature extractor 15. Regarding this feature, as another configuration example, anomaly detection device 1 may be configured to obtain, from the outside thereof, the reference feature extracted by an external device or the like, and store the obtained reference feature in reference feature storage 16 in advance. In this case, anomaly detection device 1 does not need to perform the reference feature extraction process and may be configured to not include first profile determiner 11, first extractor 12, reference packet data stream group storage 13, reference packet data distance calculator 14, or reference feature extractor 15. As yet another configuration example, anomaly detection device 1 may be manufactured in the state where the reference feature is stored in reference feature storage 16 in advance. In this case, anomaly detection device 1 does not need to perform the reference feature extraction process and may be configured to not include first profile determiner 11, first extractor 12, reference packet data stream group storage 13, reference packet data distance calculator 14, or reference feature extractor 15.

(3) In the embodiment, the detection target for anomaly detection device 1 is a packet stream, but does not necessarily need to be a packet stream and may be any stream made up of data. For example, in the data stream of an intrusion detection system detection log illustrated in FIG. 16, a series of character strings appearing in the Description column may be regarded as a detection target data stream and the anomaly detection method according to the present disclosure may be applied thereto. Alternatively, syslog message texts may be regarded as a detection target data stream and the anomaly detection method according to the present disclosure may be applied thereto. Alternatively, an appropriate column may be extracted from information of a control-related log of a control device, data in said column may be regarded as a detection target data stream, and the anomaly detection method according to the present disclosure may be applied thereto.

(4) Information calculator 28 has been described thus far as calculating, as the anomaly degree information, the sum of W consecutive supplementary information items calculated by supplementary information calculator 27. However, a function for calculating the anomaly degree information does not necessarily need to be the sum of W consecutive supplementary information items and may be any function by which the anomaly degree information is returned in response to input of W-dimensional consecutive values of the supplementary information calculated by supplementary information calculator 27.

(5) In the embodiment, each of the structural elements in anomaly detection device 1 may be individually configured into a single chip, or some or all of the structural elements may be configured into a single chip, using a semiconductor device such as an integrated circuit (IC) and a large scale integrated circuit (LSI). Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used. In addition, depending on the emergence of circuit integration technology that replaces the LSI due to progress in semiconductor technology or other derivative technology, it is obvious that such technology may be used to integrate the function blocks. Possibilities in this regard include the application of biotechnology and the like.

INDUSTRIAL APPLICABILITY

The present disclosure can be widely applied to anomaly detection in systems that use data streams.

The invention claimed is:

1. An anomaly detection method, comprising:
calculating, for a detection target data stream made up of a plurality of detection target data that are consecutive, a plurality of distances between the plurality of detection target data;
extracting a plurality of features of the detection target data stream using the plurality of distances calculated; and
calculating anomaly degree information about a degree of anomaly in the detection target data stream using the plurality of features extracted, wherein
the extracting of the plurality of features includes extracting the plurality of features each made up of L consecutive distances among the plurality of distances, wherein L is an integer greater than or equal to 2, and
the calculating of the anomaly degree information includes:
calculating supplementary information for each of the plurality of features extracted, using a difference in the feature, wherein the supplementary information is used to calculate the anomaly degree information; and
calculating the anomaly degree information for each of one or more information calculation target windows made up of N detection target data among the plurality of detection target data, using all items of supplementary information calculated from the N detection target data, wherein N is an integer greater than or equal to L+1.

2. The anomaly detection method according to claim 1, wherein
the calculating of the plurality of distances includes calculating the plurality of distances by using data parts of packets as the plurality of detection target data.

3. The anomaly detection method according to claim 1, wherein
the calculating of the plurality of distances includes calculating the plurality of distances by using a Levenshtein distance between the plurality of detection target data.

4. The anomaly detection method according to claim 2, wherein
a Levenshtein distance between the plurality of detection target data is calculated for each pair of detection target data that are P data apart from each other in the detection target data stream, and the calculation is applied in units of Q bits to at least a portion of bit strings included in the data parts, wherein P is an integer greater than or equal to 1, wherein Q is an integer between 1 and 16, inclusive, and
in the calculating of the plurality of distances, a distance is calculated for each pair of the detection target packets that are P data apart from each other in the detection target data stream to calculate the plurality of distances.

5. The anomaly detection method according to claim 1, wherein
the calculating of the plurality of distances includes calculating the plurality of distances between limited pairs of detection target data that are of an identical type among the plurality of detection target data.

6. The anomaly detection method according to claim 1, wherein
the difference is an Lp distance.

7. The anomaly detection method according to claim 6, wherein
the calculating of the supplementary information includes calculating the Lp distance between each of the plurality of features extracted and each of a plurality of reference features stored in advance, and calculating a k-nearest neighbor distance between the feature and the plurality of reference features stored in advance, as the supplementary information, using a k-nearest neighbor algorithm in which the Lp distance calculated is used.

8. The anomaly detection method according to claim 1, wherein
the calculating of the anomaly degree information includes calculating the anomaly degree information by calculating, for each of the one or more information calculation target windows, a sum of all the items of the supplementary information calculated from the N detection target data.

9. The anomaly detection method according to claim 1, further comprising:
calculating, for each of one or more reference data streams made up of a plurality of reference data that are consecutive, a plurality of reference distances between the plurality of reference data; and
extracting each of a plurality of reference features of the one or more reference data streams using a corresponding one of the plurality of reference distances calculated, wherein
the calculating of the anomaly degree information about the degree of anomaly in the detection target data stream includes calculating the anomaly degree information by further using each of the plurality of reference features extracted.

10. The anomaly detection method according to claim 9, wherein
the calculating of the plurality of reference distances includes calculating the plurality of reference distances by using a Levenshtein distance between the plurality of reference data.

11. The anomaly detection method according to claim 10, wherein
the Levenshtein distance between the plurality of reference data is calculated for each pair of reference data that are P data apart from each other in the one or more reference data streams, and the calculation is applied in units of Q bits to at least a portion of bit strings included in data parts of packets serving as the reference data, wherein P is an integer greater than or equal to 1, wherein Q is an integer between 1 and 16, inclusive, and
the calculating of the plurality of reference distances includes calculating each of the plurality of reference distances by calculating a reference distance for each pair of the reference data that are P data apart from each other in the one or more reference data streams.

12. The anomaly detection method according to claim 7, further comprising:
calculating, for each of one or more reference data streams made up of a plurality of reference data that are consecutive, a plurality of reference distances between the plurality of reference data;
extracting each of a plurality of reference features of the one or more reference data streams using a corresponding one of the plurality of reference distances calculated; and
storing, as one of the plurality of reference features that is stored in advance, each of the plurality of reference features extracted.

13. The anomaly detection method according to claim 9, wherein
the calculating of the plurality of reference distances includes calculating each of the plurality of reference distances between limited pairs of reference data that are of an identical type among the plurality of reference data.

14. An anomaly detection device, comprising:
a processor; and
a memory including a program that, when executed by the processor, causes the processor to:
calculate, for a detection target data stream made up of a plurality of detection target data that are consecutive, a plurality of distances between the plurality of detection target data;
extract a plurality of features of the detection target data stream using the plurality of distances; and
calculate anomaly degree information about a degree of anomaly in the detection target data stream using the plurality of features, wherein
the processor extracts the plurality of features each made up of L consecutive distances among the plurality of distances, wherein L is an integer greater than or equal to 2, and
the processor calculates supplementary information for each of the plurality of features, using a difference in the feature, and calculates the anomaly degree information for each of one or more information calculation target windows made up of N detection target data among the plurality of detection target data, using all items of supplementary information calculated from the N detection target data, wherein the supplementary information is used to calculate the anomaly degree information, wherein N is an integer greater than or equal to L+1.

15. The anomaly detection device according to claim 14, wherein the program, when executed by the processor, further causes the processor to:
calculate, for each of one or more reference data streams made up of a plurality of reference data that are consecutive, a plurality of reference distances between the plurality of reference data; and
extract each of a plurality of reference features of the one or more reference data streams using a corresponding one of the plurality of reference distances, wherein
the processor calculates the anomaly degree information by further using each of the plurality of reference features.

* * * * *